W. S. CHAPMAN.

Thill-Coupling.

No. 2,358 Reissued Sept. 18. 1866.

N. PETERS, PHOTO-LITHOGRAPHER, WASHINGTON, D. C.

UNITED STATES PATENT OFFICE.

WILLIAM S. CHAPMAN, OF BALTIMORE, MARYLAND.

IMPROVEMENT IN PREVENTING RATTLING IN CARRIAGES.

Specification forming part of Letters Patent No. 11,471, dated August 8, 1854; Reissue No. 2,358, dated September 18, 1866.

*To all whom it may concern:*

Be it known that I, WILLIAM S. CHAPMAN, of Baltimore, Maryland, formerly of Cincinnati, in the State of Ohio, have invented a new, useful, and Improved Method of Preventing the Rattling Noise caused by the Shafts of Carriages, and of rendering the parts less liable to wear and become injured, thereby adding to the safety of riding-vehicles; and in this reissued and amended patent I do hereby declare the following to be a full and exact description of my said invention, which will be more fully understood by referring to the accompanying drawings, in which—

Figure 3:
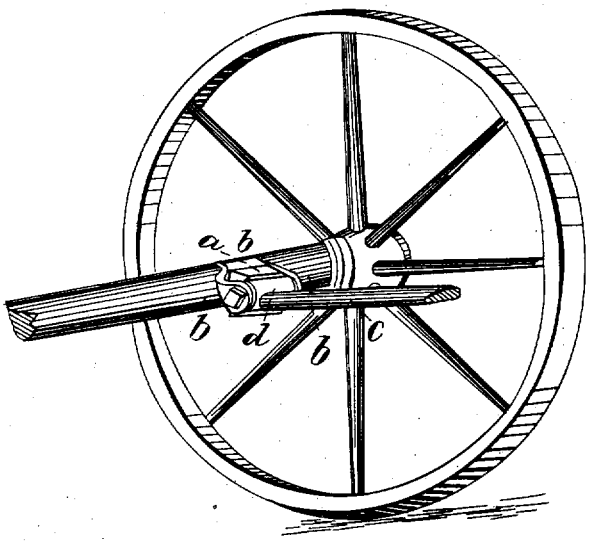
Figure 2:
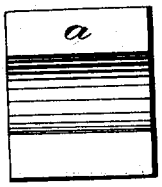
Figure 1:
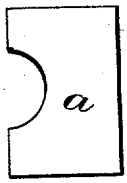
Figure 4:
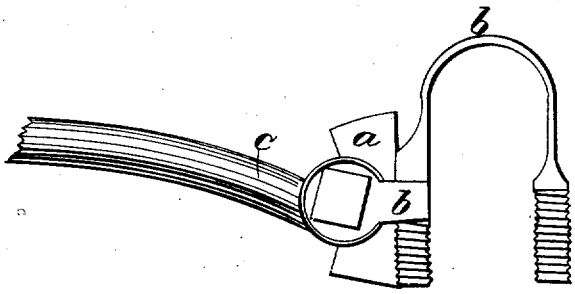

Figure 1 exhibits a vertical section of the rubber block. Fig. 2 is a front view of the same. Fig. 3 is a perspective view of the block, clip, and shaft. Fig. 4 is a side view thereof.

The shafts of carriages are usually attached to the front axle by means of bolts passing through eyes in the ends of the shafts and secured by nuts in a forked piece of metal usually termed the "clip." From the irregular and constantly-varying motions of the horse and carriage this part is very liable to wear, and the nut, from the continual jarring and turning of the bolt, to become loose and slip off. This is generally the first part to wear out, and the noise from the rattling of the bolt or shaft is very annoying.

All these difficulties I obviate by the insertion of blocks of india-rubber of a peculiar form between the ends of the shafts and the clips, or in some other equivalent position.

The blocks may be used to stop the rattling of old carriages, and should always be used with new ones as a preventive of noise, wear, and consequent accidents.

Experience has fully demonstrated that oiling or greasing the bolts of the clips increases instead of diminishing the wear of those parts in consequence of the adhesion of dust and grit to the oiled surfaces. The india-rubber blocks therefore, to a certain extent, supply the place of a lubricating material, and add greatly to the comfort and safety of riding.

In cases where the shaft is loose in a clip a sudden start of the horse brings his full momentum suddenly against the inertia of the carriage, and often tears out the clip or breaks the bolt. This difficulty I aim to prevent.

In the drawings, *a* is the block of rubber; *b*, the clip; *c*, the shaft, attached thereto in the usual way. The block is here represented in place, where it is held by virtue of its form, which projects above and below the eye *d* on the end of the shaft.

The block of india-rubber is to be strained into place in such a way as to exert a very considerable pressure or tension between the clip and the end of the shaft. I prefer so great a compression as will reduce the portion of rubber which is interposed between the clip and the end of the shaft, or in any other equivalent position, to about one-half its normal thickness. Such a compression gives the rubber sufficient elastic force to hold the parts firmly in position, and to prevent the evils intended to be guarded against.

It will be seen that the block *a* is not only of such a shape as to hold itself in place, but that it is so placed and proportioned as to be forcibly compressed, so that it will press strongly against the bolt which connects the shaft with the clip. That pressure will hold the bolt in its proper position independently of the nut which is intended to secure the same, and therefore affords a double safeguard against accident.

I am aware that strips of india-rubber shoes have sometimes been drawn into the clips of carriages to prevent the rattling of the shafts; but they were not of the proper shape to retain their position without the use of other contrivances, and were, besides, not under sufficient pressure to produce the result I am seeking. This, therefore, I do not claim; but What I do claim as new, and desire to secure by Letters Patent, is—

1. The employment of blocks of india-rubber or other equivalent elastic material, so shaped as to be self-sustaining in position when interposed between the ends of the carriage shafts or poles and the clips to prevent rattling, substantially as above described.

2. The use of india-rubber blocks or other equivalent elastic material interposed between the ends of carriage-shafts and the clips in such a way and under such strong compression as to hold the bolts in place independently of the nuts, and also to prevent the rattling of the parts, substantially as above described.

3. As a new manufacture, a block of india-rubber or other equivalent elastic material intended to be used as herein contemplated when made substantially in the form described—that is to say, when so shaped that it will remain permanently in place and perform its functions without the aid of any other special contrivance for that purpose, in the manner above set forth.

In witness whereof I have hereunto subscribed my name this 25th day of July, 1866.

WM. S. CHAPMAN.

Witnesses:

EDW. SCHAFER,

HENRY SYLVESTER.